United States Patent [19]

Yoshida et al.

[11] 3,925,091
[45] Dec. 9, 1975

[54] METHOD AND AN APPARATUS FOR BURNING THE MATERIAL FOR THE MANUFACTURE OF CEMENT

[75] Inventors: Eiji Yoshida, Yashiro; Yoshimasa Hayashi, Saitama, both of Japan

[73] Assignee: Nihon Cement Company Limited, Tokyo, Japan

[22] Filed: Mar. 28, 1975

[21] Appl. No.: 455,551

[30] Foreign Application Priority Data
Apr. 11, 1973 Japan............................ 48-41034

[52] U.S. Cl.................. 106/100; 34/57 E; 432/16; 432/106
[51] Int. Cl.² ...................... C04B 7/36; F26B 17/00; F27B 15/12; F27B 7/02
[58] Field of Search................................. 106/100; 432/15–16, 58, 106; 34/57 E

[56] References Cited
UNITED STATES PATENTS
1,605,279  11/1926  Pike .................................... 106/100
3,452,968   7/1969  Shimizu et al. .................... 432/16 X Primary Examiner—Patrick P. Garvin
Assistant Examiner—John P. Sheehar
Attorney, Agent, or Firm—Toren McGeady and Stanger

[57] ABSTRACT

A method and an apparatus for burning the material for the manufacture of cement, which comprises: setting up a calcining zone by forming a constriction in the charging-end duct of the kiln, providing a riser duct with a conicylindrical lower portion on the constriction, connecting a secondary-air intake duct to the riser duct, and installing inside the riser duct a combustion system so positioned as to inject fuel toward the center of the duct; disposing the calcining zone between the suspension preheater and the kiln; introducing the material preheated by the suspension preheater into the upper end of the calcining zone, while, at the same time, supplying secondary air for combustion of fuel to the riser duct, thus calcining the material with the ascending, swirling stream of the resulting combustion gas; and then separating the calcined material from the exhaust gas in a separator and feeding the material to the kiln.

11 Claims, 5 Drawing Figures

FIG. 2
FIG. 5
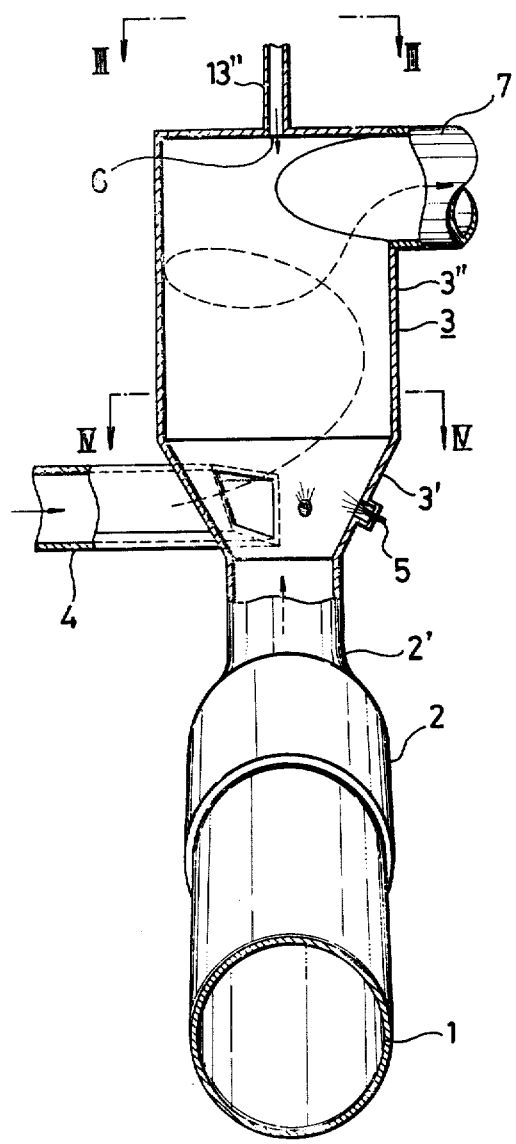
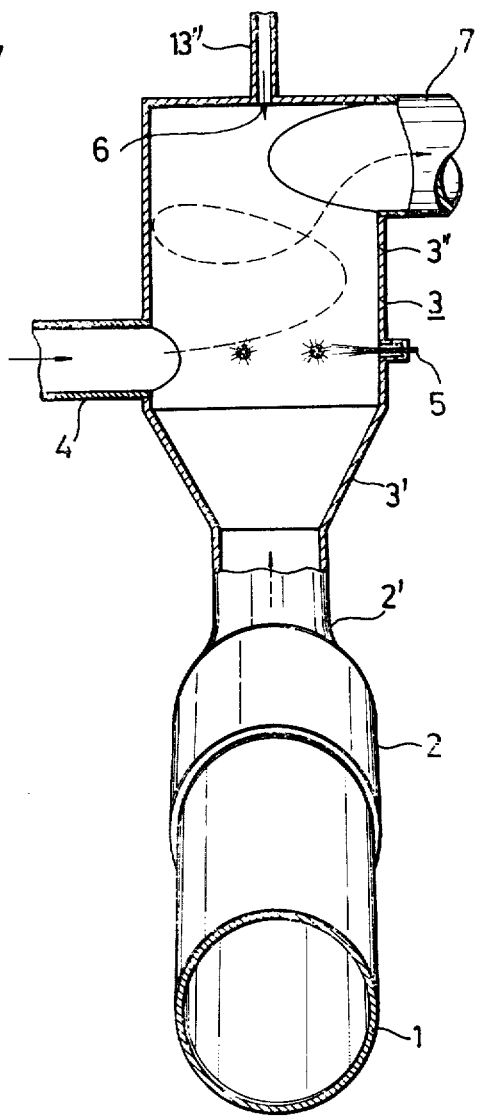

METHOD AND AN APPARATUS FOR BURNING THE MATERIAL FOR THE MANUFACTURE OF CEMENT

SUMMARY OF THE INVENTION

This invention relates to a method for manufacturing cement by burning, including a process step of calcining the material in a zone provided for that purpose between a suspension preheater and a rotary kiln, and an apparatus adapted for practicing the method.

As is well known in the art, the incorporation of the calcination step into the burning operation for the formation of cement clinker is intended, for one thing, for an improvement in the thermal efficiency of the entire burning process and, for the other, for a reduction in size of the equipment, particularly the rotary kiln, for carrying out the process. Usually the degree of decarbonation achieved of the cement material in a suspension preheater is at most about 45 to 50 percent. Without calcining means, the burning process would involve the decarbonation of the untreated material solely in the rotary kiln, which is not necessarily an efficient decarbonating equipment. This naturally requires an elongated kiln and a correspondingly increased fuel consumption.

It is therefore a principal object of the present invention to provide a burning method for cement making, whereby the cement material is highly decarbonated, before being charged into a rotary kiln, by means of a calcining zone of a novel construction disposed between a suspension preheater and the kiln.

The object of the invention is realized by a method of burning cement material for the manufacture of cement, which comprises: setting up a calcining zone by forming a constriction in a charging-end duct of a rotary kiln, locating a riser duct with a coni-cylindrical lower portion on the constriction, connecting a secondary-air intake duct tangentially to the conically or straightly cylindrical portion of the riser duct, and installing a combustion system inside the same portion of the duct so as to inject fuel toward the center of the duct; disposing the calcining zone between a suspension preheater and the rotary kiln; and introducing the material into the upper end of the calcining zone, while, at the same time, burning fuel with air supplied from a cement clinker cooler through the secondary-air intake duct to the riser duct, in the form of a swirling stream, thus calcining the material with the ascending, swirling stream of combustion gas thereby produced.

Also, the invention provides an apparatus including a suspension preheater, a rotary kiln, and a cement clinker cooler, for burning the material for the manufacture of cement, which comprises: a kiln duct formed with a given length of a cylindrical constriction; a riser duct having a coni-cylindrical lower portion and a straightly cylindrical body portion, said riser duct being connected at its conical lower end to the upper end of the kiln duct; a secondary-air intake duct connected tangentially to the conically or straightly cylindrical portion of the riser duct, and a combustion system installed inside the same portion of the duct so as to inject fuel toward the center of the duct; said riser duct being connected at its upper end to the lower end of the suspension preheater, said secondary-air intake duct being connected to the cement clinker cooler.

BRIEF DESCRIPTION OF THE INVENTION

These and other objects, advantages, and features of the present invention will become more apparent from the following description taken in connection with the accompanying drawings illustrating the method of the invention as incorporated in an equipment for the manufacture of cement. In the drawings:

FIG. 2 is a partly sectional view showing, on an enlarged scale, a calcining zone that forms the very essence of the invention;

FIG. 5 is a view similar to FIG. 2 but showing a modified form of the calcining zone.

DETAILED DESCRIPTION OF THE INVENTION

Figure 1:
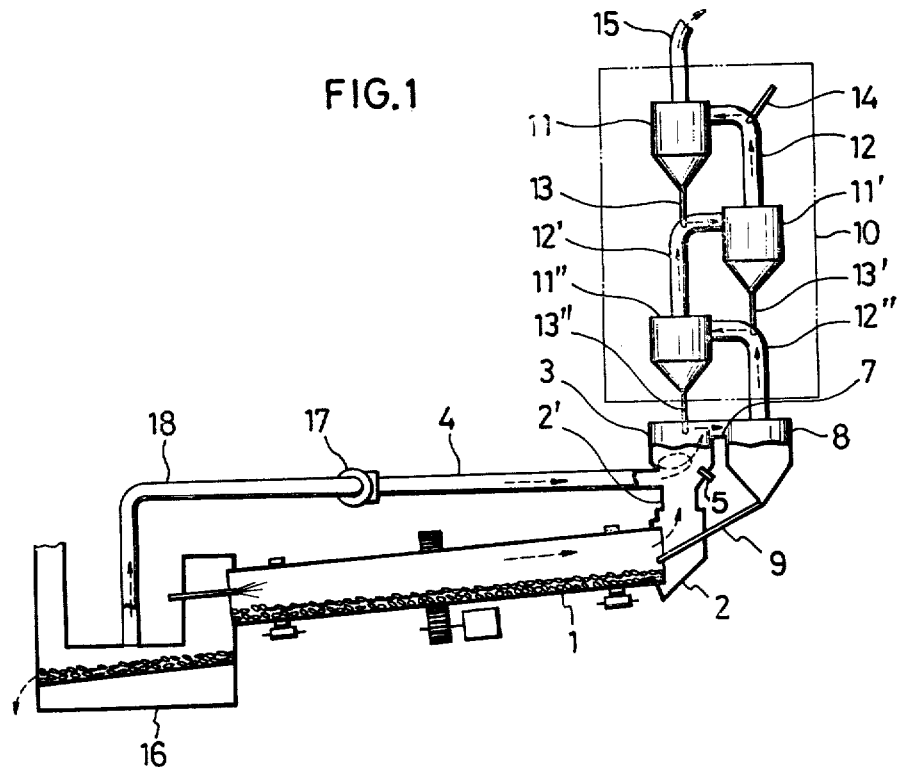
FIG. 1 is a diagrammatic side elevation of a burning apparatus for carrying out the method of cement making according to the invention.
Figure 3:
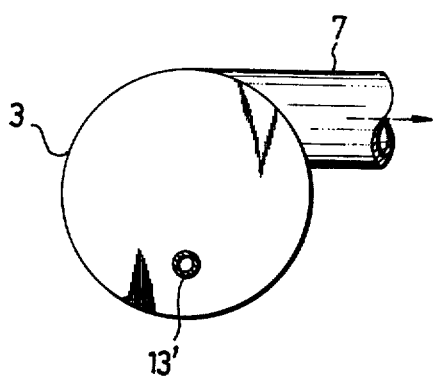
FIG. 3 is a view of the same zone as seen along the line of section III—III in FIG. 2.
Figure 4:
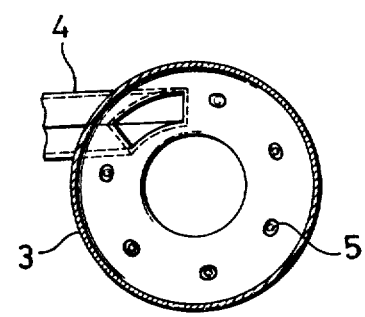
FIG. 4 is a section on the line IV—IV in FIG. 2.

Referring now to the drawings, a rotary kiln 1 is shown with its charging end enclosed in a duct 2, which in turn is connected, via a constriction 2', to a riser duct 3 having a lower portion shaped to be an inverted truncated cone. The constriction 2' takes the form of a short cylinder with a given length. An intake duct 4 for supplying secondary air is connected tangentially to the coni-cylindrical periphery 3' of the lower portion of the riser duct 3. Inside the periphery 3' there is provided a combustion system comprising six burners 5 with their nozzles directed obliquely upward to the center of the duct, and a line (not shown) for supplying primary air for combustion.

The main body 3'' of the riser duct 3, in the form of a straight cylinder, has a port 6 at its top for the introduction of material. Also the body 3'' is communicated to a material separator 8 of the cyclone type via an exhaust-gas outlet duct 7.

The material separated from the stream of exhaust gas by the separator 8 subsequent to calcination is charged into the rotary kiln 1 by way of a charging chute 9 extending through the charging-end duct 2.

Above the calcining zone constructed in the manner just described, there is installed a suspension preheater of a known type, generally indicated at 10. The preheater comprises material chutes 13, 13', 13'', passages 12, 12', 12'', and cyclones 11, 11', 11'''. The chute 13'' is connected to the material-supplying port 6.

Raw material to be burned is fed to the suspension preheater through a feed line 14 connected to the passage 12. The secondary-air intake duct 4 is communicated with a cement clinker cooler 16 via a line 18 equipped with a blower 17. Thus, the secondary air preheated by the clinker cooler 16 is drawn by suction from the cooler into the calcining zone by means of the blower 17.

In the apparatus according to the invention, the constriction 2' formed in the charging-end duct 2 of the kiln narrows down the flow passage for the exhaust gas from the kiln, permitting the gas to ascend at an increased velocity. The accelerated flow of the exhaust gas blows up the raw material that has been fed at the port 6 and once dropped above the constriction 2', and keeps the material from directly falling into the kiln. Meanwhile, the secondary air extracted from the cement clinker cooler 16 is forced into the riser duct 3, where it ascends in a swirling stream. The material is, therefore, further dispersed in the space within the duct and is mostly dispersed uniformly in the secondary air by virtue of the swirling stream of the secondary air as well as by the accelerated flow of exhaust gas from the kiln. The burners 5 then inject fuel into the zone wherein the material is dispersed, and burn the material for calcination.

In ordinary operation, the pressure loss of the gas in the kiln is less than that of the air extracted from the clinker cooler via the combustion-air intake duct. Thus, in order to introduce the air from the cooler into the riser duct, a booster blower must be installed to make up for the differential between these pressure losses. The blower may be dispensed with, however, by choosing a constriction 2' with suitable throat dimensions. The constriction 2' has the dual purpose of lifting the material and balancing the gas pressures. For this reason, the constriction is designed to have proper diameter and length in consideration of the material charging position, whether any baffle is employed or not, and the gas velocity at the constriction. (No baffle is provided in the embodiment shown.)

The secondary air admitted to the duct 3 acts on the flow of the material that has been dispersed by the exhaust gas from the kiln, in such a manner as to hamper the immediate delivery of the dispersed material to the cyclone separator by the lifting effect of the constriction 2'. This prolongs the residence time of the material in the duct and permits an adequate heat exchange.

In view of the foregoing, the swirl of the secondary air has only to be strong enough to perform the above-said action efficiently; a too vigorous swirling stream is objectionable because it simply increases the gas pressure loss.

Calcined cement material passes through the exhaust-gas outlet duct 7 into the cyclone separator 8, where it is separated from the exhaust gas and fed to the kiln 1 through the chute 9. On the other hand, the combustion exhaust gas from the separator 8 passes through the passages 12, 12', 12'' while heating the raw material, and leaves the equipment through the exhaust pipe 15.

In the method of the invention, the secondary air is extracted from the cement clinker cooler and is supplied, in an adequately preheated state, to the calcining zone. The preheated secondary air is combined with the hot exhaust gas from the kiln to carry out the calcination of the material at a sufficiently high temperature, with a saving of the fuel consumption.

The calcining zone that forms the essence of the present invention, as is clearly shown in the accompanying drawings, consists in essence of a duct which is made up of a straightly cylindrical body portion and a coni-cylindrical lower portion and installed in the riser section between the charging-end duct of a rotary kiln and a suspension preheater. The arrangement according to the invention makes it unnecessary to provide any calcining furnace of a special construction lined with a special material as used in the conventional cement plants. The method of the invention is also readily applicable to existing rotary kiln installations equipped with suspension preheaters, by partly remodelling the final-stage cyclone and thereby providing a calcining zone in conformity with this invention.

While the embodiment of the invention described above has six burners installed on the coni-cylindrical portion of the riser duct, it is alternatively possible to provide them and the secondary air duct on the straightly cylindrical portion of the riser duct, as illustrated in FIG. 5. Further, the burners shown in FIG. 5 on the same level as the secondary air duct to inject fuel horizontally may be directed obliquely downward instead, where the duct is to be located below the burners. Thus, the positions, directions, number, and intervals of installation of the burners are not specifically limited but may be suitably chosen depending on the given operating conditions, such as the feed rate of the material, calcining temperature, and the flow velocity of combustion gas.

Since the cement-making apparatus that carries out the method of the invention is simple in construction capable of achieving a high thermal efficiency, the present invention offers a great economic advantage from the viewpoint of commercial operation.

What is claimed is:

1. In a method of burning cement material using a rotary kiln with the attachment of a suspension preheater equipped with a material burning furnace, said method comprising forming a constriction in the charging-end duct of a rotary kiln, connecting a riser duct formed of a straightly cylindrical upper body portion and a coni-cylindrical lower portion direct onto said constriction at the coni-cylindrical lower portion, said riser duct being provided with a secondary-air intake duct for utilizing air extracted from a clinker cooler and installing in the riser duct a combustion means so positioned as to inject fuel toward the center of the duct, disposing a calcining zone thus set up by said combustion means between the suspension preheater and the kiln, introducing the material preheated by the suspension preheater into the upper end of the calcining zone, while, at the same time, supplying secondary air for combustion of the fuel into the riser duct in a tangential direction so as to form a swirling flow therein, flowing the exhaust gases from said kiln through the constriction to supply an ascending stream to the calcining zone, burning the material with the ascending and swirling stream of the resulting combustion gas, separating the calcined material from said exhaust gas of the riser duct in a separator provided through the outlet of exhaust gas in the upper part of the riser duct, and finally charging the material thus treated to the rotary kiln.

2. A method as claimed in claim 1 wherein the secondary air is tangentially delivered to the straightly cylindrical upper body portion of the riser duct.

3. A method as claimed in claim 1 wherein the secondary air is tangentially delivered to the coni-cylindrical portion of the riser duct.

4. A method as claimed in claim 1 wherein the diameter and length of the constriction in the kiln duct are so chosen as to provide no differential between the pressure loss of the gas in the kiln and that of the air extracted from the clinker cooler through the secondary air intake duct.

5. A method as claimed in claim 1 wherein the flow velocity of the exhaust gas from the kiln is determined depending upon the diameter and length of the constriction in the kiln duct.

6. In an apparatus for burning the material for the manufacture of cement, including a suspension preheater, a rotary kiln, and a cement clinker cooler, the improvement comprising: a kiln duct formed with a given length of a cylindrical constriction; a riser duct having a coni-cylindrical lower portion and a straightly cylindrical upper body portion, said riser duct being connected at its conical lower end to the upper end of the kiln duct; and said riser duct being connected to a material separator by an exhaust gas outlet duct; a secondary-air intake duct connected to the riser duct; and a combustion system installed inside the riser duct and so positioned as to inject fuel toward the center of the duct; said riser duct being connected at its upper end to the lower end of the suspension preheater, said secondary-air intake duct being connected to the cement clinker cooler.

7. An apparatus as claimed in claim 6 wherein the secondary-air intake duct is connected to the cement clinker cooler via air-extracting means.

8. An apparatus as claimed in claim 6 wherein the combustion system is installed in the coni-cylindrical portion of the riser duct and directed obliquely upward and toward the center of the duct.

9. An apparatus as claimed in claim 6 wherein the combustion system is installed in the straightly cylindrical body portion of the riser duct and directed toward the center thereof.

10. An apparatus as claimed in claim 6 wherein the secondary-air intake duct is open tangentially in the straightly cylindrical portion of the riser duct.

11. An apparatus as claimed in claim 6 wherein the secondary-air intake duct is open tangentially in the coni-cylindrical portion of the riser duct.

* * * * *

UNITED STATES PATENT OFFICE
CERTIFICATE OF CORRECTION

Patent No. 3925091      Dated December 9, 1975

Inventor(s) Eiji Yoshida et al

It is certified that error appears in the above-identified patent and that said Letters Patent are hereby corrected as shown below:

In the heading of the Patent [22] should read as follows:

--[22] Filed: March 28, 1974--.

Signed and Sealed this ninth Day of March 1976

[SEAL]

Attest:

RUTH C. MASON  
Attesting Officer

C. MARSHALL DANN  
Commissioner of Patents and Trademarks